Aug. 23, 1949.                    M. P. WINTHER                    2,479,989
                              EDDY-CURRENT COUPLING
Filed Sept. 14, 1946                                         2 Sheets-Sheet 2

Martin P. Winther
Inventor.
Haynes and Koenig
Attorneys.

Patented Aug. 23, 1949

2,479,989

UNITED STATES PATENT OFFICE 2,479,989

EDDY-CURRENT COUPLING

Martin P. Winther, Waukegan, Ill., assignor to Martin P. Winther, as trustee

Application September 14, 1946, Serial No. 697,106

6 Claims. (Cl. 172—284)

This invention relates to eddy-current couplings and, more particularly, to self-exciting eddy-current clutches.

Among the several objects of the invention may be noted the provision of an improved self-exciting eddy - current coupling particularly adapted for use as a clutch in an internal combustion engine drive; the provision of a coupling of this class embodying an alternating current generator and means for rectifying the output of the generator for supplying direct current to excite the field of the coupling; the provision of a coupling of this class embodying improved means for deenergizing the field of the coupling while it is rotating; and the provision of a coupling of this class wherein provision is made for cooling its elements including the generator and the rectifying means. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

Figure 1:
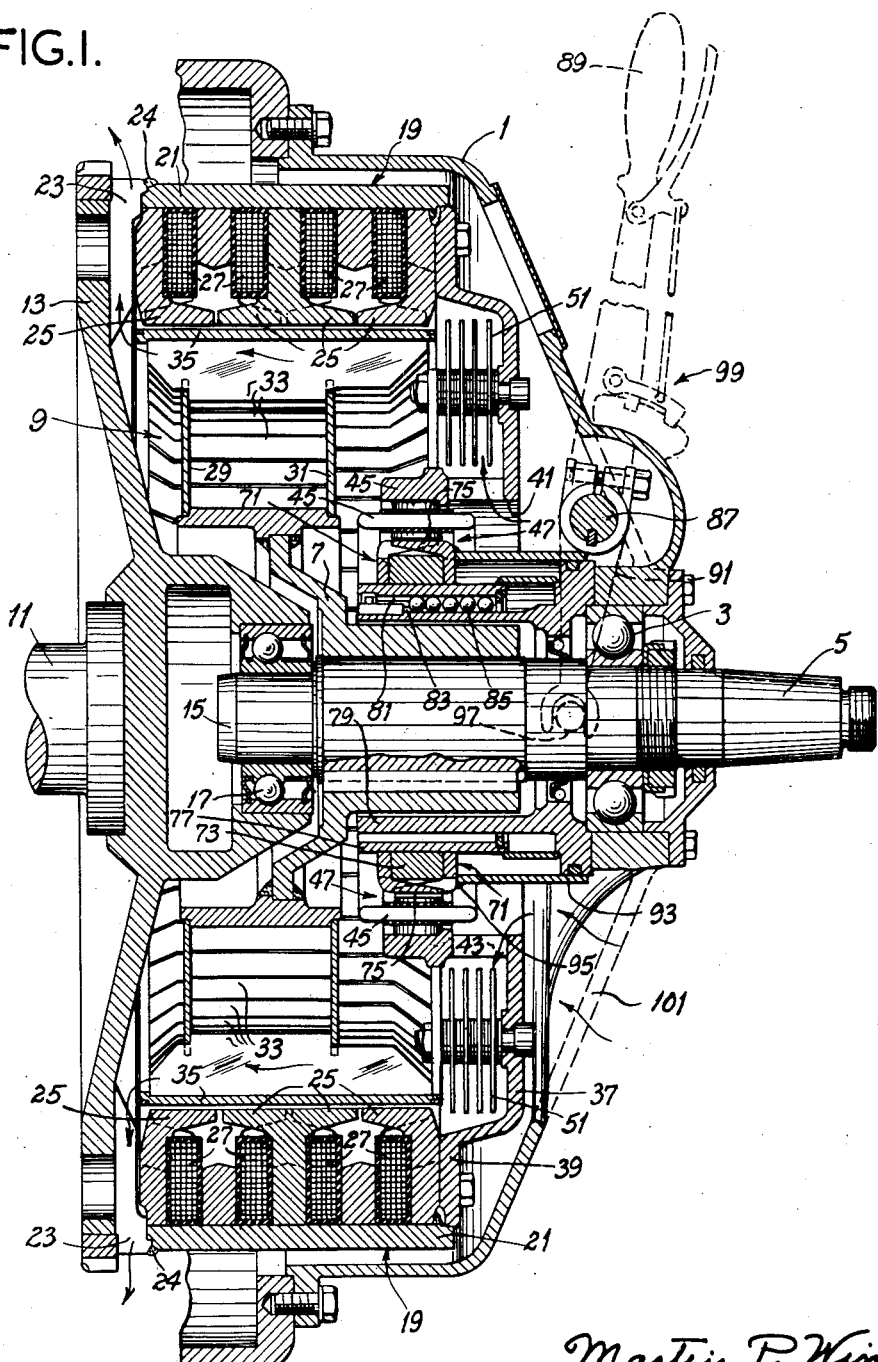
Figure 2:
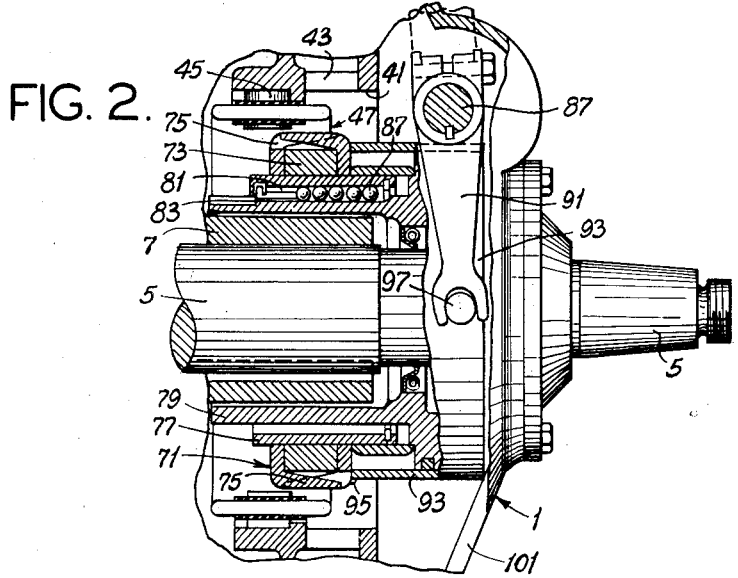
Figure 3:
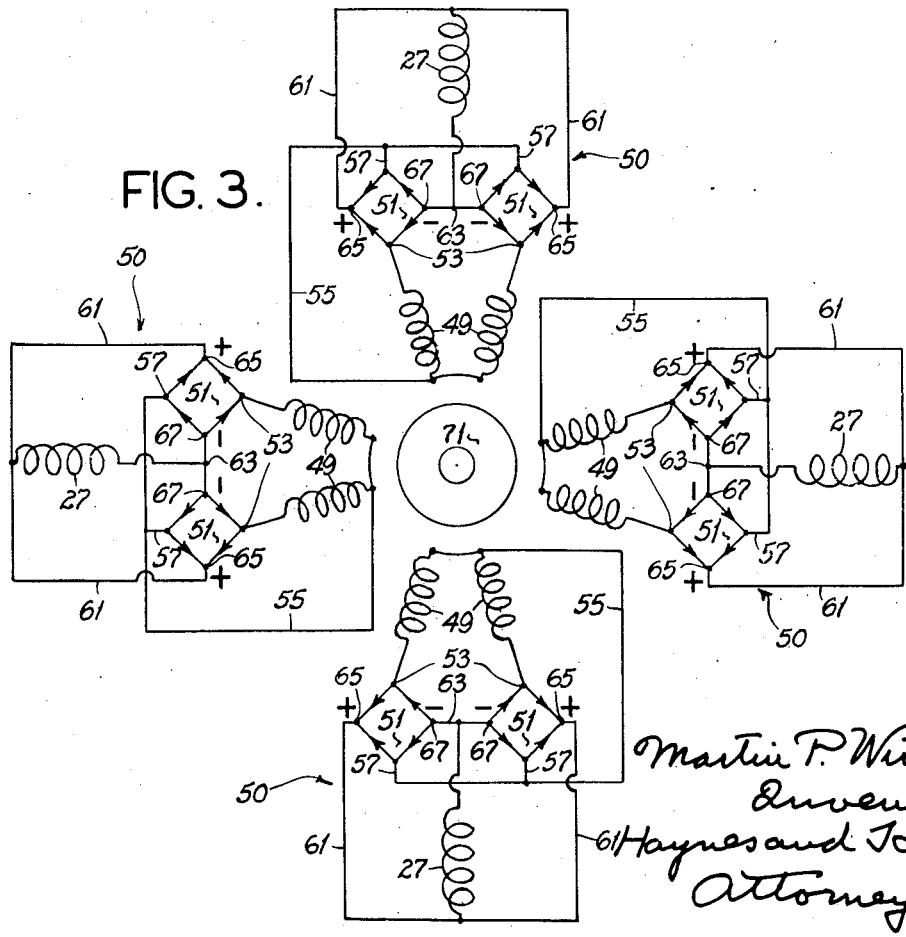

In the accompanying drawings, in which one of various possible embodiments of the invention is illustrated, Fig. 1 is a longitudinal cross section of the eddy-current coupling of this invention;

Fig. 2 is a fragmentary longitudinal section illustrating a different position of certain elements of the coupling; and, Fig. 3 is a wiring diagram of the eddy-current coupling.

Similar reference characters indicate corresponding parts throughout the several views of the drawings.

Eddy-current couplings of the class herein described require direct current for excitation of their field coils. Where no suitable power supply is available, use of such clutches has heretofore been precluded. Where an alternating current supply is available, it has been necessary to provide separate rectifying equipment to provide for a supply of direct current to the coupling. This invention provides an eddy-current coupling which includes integrated means for supplying direct current to energize its field so that it may be employed even where no power supply is available, or where alternating current is available, without the necessity for the provision of separate rectifying equipment. The coupling of this invention is described herein particularly with reference to its application as a clutch, but it will be understood that its principles are applicable to brakes, dynamometers and like apparatus.

Referring now to the drawings, there is shown at numeral 1 a clutch housing wherein is journalled by means of a bearing 3 the driven shaft 5 of the clutch. Keyed on the shaft 5 is the hub 7 of the driven inductor member 9 of the clutch. Reference character 11 designates a drive shaft, such as a crank shaft of an internal combustion engine (not shown). Flywheel 13 is fixed on the end of the drive shaft. The reduced end 15 of the driven shaft 5 is journalled in a pilot bearing 17 in the flywheel. Carried by the flywheel surrounding the inductor member 9 is the driving annular field member 19 of the clutch.

The field member 19 includes a drum 21 secured to radial ribs 23 on the face of the flywheel as by welding 24. Carried within this drum is an assembly of annular toothed rings 25 and a winding comprising annular field coils 27 similar to the clutch field assembly disclosed in my copending application Serial No. 693,057, filed August 26, 1946, for Eddy-current coupling, issued as Patent No. 2,452,820, November 2, 1948. In this instance, four annular field coils 27 are provided instead of two, as in said copending application, and the toothed ring structure is accordingly made in duplicate. Since the specific construction of this assembly does not form a part of the invention, and since it is particularly disclosed in said copending application, further detail is unnecessary.

The inductor member 9 comprises a pair of plates 29 and 31 mounted on the hub 7 and supporting axially extending thin flexible fins 33. These fins extend radially outward from the peripheries of the plates and carry inductor ring segments 35 spaced from the internal surface of the field member 19 with as small an air gap as is consistent with mechanical clearance. Particular details of this type of inductor construction are disclosed in my aforesaid copending application and are important so far as this invention is concerned only in that the spaces between the fins provide passages for cooling air as will be made clear.

A dished carrier plate 37, preferably made of aluminum, has a flange 39 secured in the end of the field drum 21 opposite the flywheel in engagement with the toothed ring assembly in the drum. This plate has a large central opening 41 of substantially greater diameter than certain elements passing therethrough and to be described so as to provide for passage of cooling air, as will be made clear. Plate 37 is formed with an annular series of spaced supports 43 at the periphery of the opening 41. These supports carry the annular armature 45 of a permanent-magnet generator 47.

The armature 45 is provided with a plurality (eight in this instance) of internal windings 49 (Fig. 3). These windings are paired, each pair of windings being in one of four separate independent rectifier circuits 50 for respectively supplying direct current to the four clutch field coils 27. The four rectifier circuits 50 are identical. Each includes a pair of windings 49 and a pair of rectifiers 51. These rectifiers are preferably of the selenium bridge type and the eight rectifiers (Fig. 3) are mounted on carrier plate 37 symmetrically around its axis so as to rotate with the armature in dynamic balance. With rectifiers 51 rotating with generator windings 49, there is no necessity for slip-ring connections therebetween. Copper oxide rectifiers or the like may also be used.

One end of each of the pair of windings 49 in a rectifier circuit is connected to the input terminal 53 of each of the pair of rectifiers in the circuit. The other end of each of the pair of windings is connected to a wire 55. Wires 57 connect the other input terminal of each rectifier and wire 55. The clutch field coil 27 in a rectifier circuit 50 is connected across the output terminals of the two paired rectifiers in the circuit. As illustrated, wires 61 and 63 connect the corresponding output terminals 65 and 67 of the paired rectifiers, respectively. Coil 27 is connected across wires 61 and 63 so as to receive direct current from both rectifiers. If one rectifier should fail, the coil receives current from the other.

It will be understood that the particular wiring system used is exemplary of various equivalents which may be used for the purpose.

The generator 47 also includes a field 71 comprising an annular permanent magnet 73, such as an "Alnico" magnet, and a lapped-tooth pole assembly 75 similar to that disclosed in Fig. 6 of the copending application of myself and Anthony Winther for Dynamo-electric machine Serial No. 616,122 filed September 13, 1945, issued as Patent No. 2,465,982, March 29, 1949. The generator field 71 is fixed against rotation but may move axially into and out of the generator armature as will be made clear.

The generator field 71 is carried by a sleeve 77 which surrounds a fixed tubular inward extension 79 of the clutch housing 1. Sleeve 77 is formed internally with three axial grooves 81 spaced 120° apart. Extension 79 is formed externally with three axial grooves 83 aligned with the grooves 71. A plurality of steel balls 85 are provided in each of these sets of grooves and the sleeve 77 is carried by these balls. Rotation of the sleeve 77 and the generator field 71 thereon is prevented by the engagement of the balls in grooves 81 and 83, but the balls form anti-friction bearings permitting axial movement of the sleeve and generator field. The length of grooves 81 and 83 is such that the generator field may move axially outward (to the right as viewed in Fig. 1) from a position within the generator armature (Fig. 1) to a position wherein it is withdrawn from the armature and is out of inductive relation with respect thereto (Fig. 2).

A rock shaft 87 is journalled in suitable bearings in the clutch housing 1. Secured to an end of this shaft extending from the housing is a control means shown as an operating lever 89. Secured to the shaft within the housing are shifting forks 91. These forks straddle a stainless steel tube 93 which is welded at 95 to the side of the generator field 71 and engage pins 97 on the tube 93. It will be clear that when lever 89 and forks 91 are pivoted counterclockwise from the Fig. 1 position the generator field is withdrawn from the armature. A conventional latch 99 may be provided for latching the lever 89 either in the Fig. 1 or the Fig. 2 position. It will be understood that the operating lever shown may be replaced by a conventional clutch operating pedal having a suitable spring return.

The clutch housing 1 is provided with a cooling air inlet aperture 101 in such position that air drawn therethrough passes through the aperture 41 of the carrier plate 37 and over the rectifiers 51.

Operation is as follows:

The clutch field member 19, carrier plate 37 and the generator armature 45 all rotate with the drive shaft 11 and flywheel 13. With the generator field 71 within the armature, as in Fig. 1, alternating current is generated in the armature windings 49 and supplied to rectifiers 51. The direct current output of the rectifiers is supplied to the clutch field coils 27 to energize the clutch and inductively to drive the inductor member 9 and driven shaft 5.

Rotation of the inductor member 9 causes a circulation of cooling air at fairly high velocity along the path indicated by the arrows in Fig. 1. As illustrated, the cooling air circulates through air inlet 101, aperture 41, the spaces between supports 43, and over the rectifiers 51. It then passes between the fins 33 and out through the spaces between the ribs 23 of the flywheel. This circulation of air cools the generator, rectifiers and the inductor ring segments of the inductor member 9. The arrangement whereby the cooling air passes at fairly high velocity over the rectifier is advantageous in that it permits use of lightweight high-capacity rectifiers.

If it is desired to deenergize the clutch without stopping the drive shaft 11, lever 89 is shifted to withdraw the generator field 71 from within the generator armature 45. With the generator field so withdrawn, and in the Fig. 2 position, it is no longer in inductive relation to the generator armature and no current is generated in the windings 49. This deenergizes the field coils 27 of the field member of the clutch, and the inductor member 9 and the driven shaft 5 come to a stop. In intermediate positions between full-open and full-closed positions, the excitation is partial. Hence the load may be picked up gradually or gradually dropped in accordance with the movement of the control member 89.

Thus, the clutch herein disclosed is self-exciting upon rotation of the prime mover driving the driving element of the clutch. The arrangement whereby the clutch may be deenergized by withdrawing the generator field from within the armature is advantageous in that it eliminates any necessity for provision of slip-ring connections such as would be required if deenergization were effected by switch controls. The feature of mounting the rectifiers for rotation with the generator armature and clutch field member is advantageous in that it also eliminates any necessity for slip-ring connections. A plurality of rectifiers are provided, rather than one, because this lends itself to dynamic balancing and also to provide for continuation of operation, even though at somewhat reduced capacity, if one of the rectifiers should fail.

It will be understood that while the field member is herein disclosed as the driving element and the inductor member as the driven element of the clutch, this relation may be reversed, as will be apparent to those skilled in the art. Also, the inductor member may surround the field member. It will also be understood that the principles herein disclosed are applicable to an arrangement wherein the generator armature is within the field, although such arrangements may necessitate the provision of slip-ring connections. An important feature is that one of the elements of the generator be driven by the driving element of the clutch for self-excitation of the clutch.

The following preferences in design characteristics may be noted. The "alnico" permanent magnet generator is preferably designed for relatively high frequencies of the order of 400 to 1,000 cycles per second resulting in desirable reduction in weight and volume of iron required in the magnetic parts. This results also in it being easier to regulate the generator output by the usual laminations used in the generator magnetic parts.

The generator should also be designed so that sufficient energy is generated and rectified at about 800 R. P. M. of the engine to give enough magnetic flux for full torque capacity of the clutch. The increase in energy generated beyond 800 R. P. M. should be as small as possible, up to the top speed of the engine. For example, in an engine having an 800 R. P. M. low speed and an 1,800 R. P. M. top speed, the energy output increase should be of the order of 25% so that normally the clutch will be over-excited by only this amount in the field coils 27 but still being sufficiently excited for tight coupling at low speed. The design details for accomplishing the above ends are known to those familiar with the design of electromagnetic apparatus.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Eddy-current apparatus comprising relatively rotatable clutch field and inductor members, one of which is a driving and the other a driven element of the apparatus, an alternating-current generator having a generator armature rotary with the field member and a generator field member fixed against rotation relative to the generator armature, and rectifying apparatus rotary as a whole with the clutch field member and generator armature, the output of said generator armature being connected to the input of said rectifying apparatus and the output of said rectifying apparatus being connected to said clutch field member for rectifying the alternating current output of the generator armature and supplying direct current to the clutch field member.

2. An eddy-current clutch comprising relatively rotatable clutch field and inductor members, one of which is the driving and the other the driven element of the clutch, an alternating-current generator comprising an armature rotary with the clutch field member and a generator magnetic field member fixed against rotation relative to the generator armature, said generator armature and generator magnetic field member being relatively movable into and out of inductive relation, and rectifying apparatus carried in whole by the clutch field member for rotation therewith and the generator armature, the output of said generator armature being connected to the input of said rectifying apparatus and the output of said rectifying apparatus being connected to said clutch field member for rectifying the alternating current output of the generator armature and supplying direct current to the clutch field member.

3. An eddy-current coupling comprising relatively rotatable annular field and inductor members, one within the other, one of which is the driving and the other the driven element of the coupling, an alternating-current generator having an annular armature rotary with the field member and a permanent-magnet field fixed against rotation within the armature, and rectifying apparatus carried in whole by the field member for rotation with the field member and armature, the output of said armature being connected to the input of said rectifying apparatus and the output of said rectifying apparatus being connected to said field member for rectifying the alternating current output of the generator and supplying direct current to the field member.

4. An eddy-current clutch comprising relatively rotatable annular field and inductor members, one within the other, one of which is the driving and the other the driven element of the clutch, an alternating-current generator having an annular armature rotary with the field member and a permanent-magnet field mounted for movement into and out of the armature and fixed against rotation relative to the armature, and rectifying apparatus carried in whole by the field member for rotation with the field member and armature, the output of said armature being connected to the input of said rectifying apparatus and the output of said rectifying apparatus being connected to said field member for rectifying the alternating current output of the generator and supplying direct current to the field member.

5. An eddy-current coupling comprising a driving annular field member including field windings, a driven inductor member within the field member, a supporting member secured over one end of said field member, an annular alternating-current generator armature carried by said supporting member, a permanent-magnet field within said armature, a plurality of rectifiers carried by said supporting member in substantially dynamically balanced relation, said armature having windings connected to the inputs of said rectifiers, the outputs of said rectifiers being connected to the windings of said field member.

6. An eddy-current clutch comprising a driving annular field member including field windings, a driven inductor member within the field member, a plate secured over one end of the field member, an annular alternating-current generator armature carried interiorly by said plate, a permanent-magnet field for the armature mounted for axial movement into and out of the armature and fixed against rotation relative thereto, a plurality of rectifiers interiorly carried by said plate in substantially dynamically balanced relation, said armature having a plurality of windings connected to the inputs of the rectifiers, the outputs of the rectifiers being connected to the windings of said field member, said plate being apertured and said inductor member having axial passages therethrough to provide for circulation of cooling air through the clutch and over said generator and rectifiers.

MARTIN P. WINTHER.

REFERENCES CITED

The following references are of record in the file of this patent:

UNITED STATES PATENTS

| Number | Name | Date |
| --- | --- | --- |
| 260,574 | Irwin | July 4, 1882 |
| 260,575 | Irwin | July 4, 1882 |
| 1,136,279 | Severy | Apr. 20, 1915 |
| 1,995,605 | Downing | Mar. 26, 1935 |
| 2,271,087 | Maier | Jan. 27, 1942 |